(12) United States Patent
Guzman (10) Patent No.: US 10,997,761 B2
(45) Date of Patent: May 4, 2021

(54) SYSTEMS AND METHODS FOR CREATING AND DELIVERING AUGMENTED REALITY CONTENT

(71) Applicant: ImagineAR Inc., Vancouver (CA)

(72) Inventor: Rodney Guzman, Vancouver (CA)

(73) Assignee: ImagineAR Inc., Vancouver (CA)

(*) Notice: Subject to any disclaimer, the term of this patent is extended or adjusted under 35 U.S.C. 154(b) by 31 days.

(21) Appl. No.: 16/196,557

(22) Filed: Nov. 20, 2018

(65) Prior Publication Data
US 2020/0151927 A1    May 14, 2020

Related U.S. Application Data

(60) Provisional application No. 62/757,880, filed on Nov. 9, 2018.

(51) Int. Cl.
| G06T 11/60 | (2006.01) |
| G06K 9/62 | (2006.01) |
| G06T 19/00 | (2011.01) |
| H04L 29/08 | (2006.01) |
| G06F 16/22 | (2019.01) |
| G06F 16/31 | (2019.01) |

(52) U.S. Cl.
CPC .......... G06T 11/60 (2013.01); G06K 9/6202 (2013.01); G06T 19/006 (2013.01); *G06F 16/22* (2019.01); *G06F 16/31* (2019.01); *H04L 67/10* (2013.01)

(58) Field of Classification Search
None
See application file for complete search history.

(56) References Cited

U.S. PATENT DOCUMENTS

| 10,467,518 B1* | 11/2019 | Schweinfurth .. G06K 19/07758 |
| 2008/0089576 A1* | 4/2008 | Bushell ................. G06T 7/593 382/154 |
| 2011/0141141 A1* | 6/2011 | Kankainen ......... G01C 21/3647 345/632 |
| 2011/0279446 A1* | 11/2011 | Castro ................... G01C 21/20 345/419 |
| 2013/0288717 A1* | 10/2013 | Choi ..................... H04W 4/021 455/456.3 |
| 2016/0110713 A1* | 4/2016 | Howe .................. H04L 9/0869 705/75 |
| 2017/0109422 A1* | 4/2017 | Satkunarajah ......... G06T 17/05 |
| 2017/0249745 A1* | 8/2017 | Fiala ....................... G06T 7/246 |
| 2018/0005440 A1* | 1/2018 | Mullins .................... G06F 9/44 |
| 2018/0063205 A1* | 3/2018 | French ............... H04L 65/1089 |
| 2018/0218525 A1* | 8/2018 | Jagerson, Jr. .......... G06Q 10/00 |
| 2018/0276899 A1* | 9/2018 | Liao ...................... G06T 19/006 |
| 2019/0236844 A1* | 8/2019 | Balasian ................. G06F 3/011 |
| 2019/0340836 A1* | 11/2019 | Lynen ...................... G06T 7/73 |

* cited by examiner

*Primary Examiner* — David H Chu
(74) *Attorney, Agent, or Firm* — Greenberg Traurig, LLP; Chinh H. Pham; Brian J. Assessor (57) ABSTRACT

The present invention relates to systems and methods suitable for creating and delivering augmented reality (AR) content. In particular, the present invention relates to systems and methods to create portable AR content to be downloaded, rendered, and displayed on a display device in real-time.

20 Claims, 7 Drawing Sheets

SYSTEMS AND METHODS FOR CREATING AND DELIVERING AUGMENTED REALITY CONTENT

CROSS-REFERENCE TO RELATED APPLICATION(S)

This application claims priority to, and the benefit of, U.S. Provisional Application No. 62/757,880, filed Nov. 9, 2018, for all subject matter common to both applications. The disclosure of said provisional application is hereby incorporated by reference in its entirety.

FIELD OF THE INVENTION

The present invention relates to systems and methods suitable for creating and delivering augmented reality (AR) content. In particular, the present invention relates to systems and methods to create portable AR content to be downloaded, rendered, and displayed on a display device in real-time.

BACKGROUND

Generally, AR is a form of mixed reality used to create interactive experiences in a real-world environment in which objects that reside in the real-word are augmented with computer generated information. AR content can be displayed using a combination of computing devices to overlay information into a real-world display. Typically, the goal of AR is to bring aspects of a digital environment into the real world to create an immersive and enriched experiences for users. AR can be used for entertainment, education, communication, and many other combinations of purposes.

The implementation of AR in consumer products requires considerable resources and knowledge. Conventionally, users that want to create an AR deliverable need to create an entire program or application from the ground up, with specific designs and considerations related to the goal of the AR program or application and the technology platform(s) that the program or application will be implemented on. Therefore, creating AR for delivery to customers can be expensive and requires persons with sophisticated knowledge about how to create an AR platform, AR content, and delivery of the AR content to users through a specified format. Additionally, when delivering, three dimensional (3D) AR content, the content must be compiled into an application that is viewing that 3D content, such that when the 3D content needs to be updated, the application viewing that 3D content must be recompiled and re-deployed. This makes it difficult for an application to be updated without a programmer updating the application code.

SUMMARY

There is a need for improvements for allowing unsophisticated users to create, manage, and deliver AR content to other users without requiring the displaying application to be recompiled or redeployed. The present invention is directed toward further solutions to address this need, in addition to having other desirable characteristics.

In accordance with example embodiments of the present invention, a system for delivering portable augmented reality (AR) content is provided. The system includes a user interface (UI) module being configured to receive AR source content from a content provider device, a transformation module designed to convert the AR source content, received from the user interface (UI) module, from a proprietary format to portable AR content in one or more native formats for rendering by devices running operating systems in the one or more native formats, and a delivery module being configured to deliver the portable AR content in the one or more native formats to the content provider device running the one or more native formats upon receipt of tokenized data from a real-world environment matching the portable AR content.

In accordance with aspects of the present invention, the UI module can be further configured to receive additional information about the AR source content including at least one of a geolocation of the content provider device and an operating system of the content provider device. The transforming of the AR source content can further include packaging one or more variants for different operating systems for the one or more native formats into an AR package. The transforming of the AR source content can further include storing the AR package in a structured database. The additional information about the AR source content can be stored in an unstructured database. The delivery module can be further configured to receive requests for AR content from one or more content consumer devices, the request including at least one of a geolocation and a real-world image at the geolocation. In response to the received requests, the delivery module can b further configured to determine whether to deliver the portable AR content to the one or more content consumer devices based on the additional information. The additional information can include a marker and the determining can include comparing the marker to the real-world image to identify the marker at the geolocation.

In accordance with example embodiments of the present invention, a method for delivering portable augmented reality (AR) content is provided. The method includes receiving, from a content provider device, AR source content and metadata to be associated with the AR content uploaded by an end user, transforming and packaging, by a content management system, the AR source content into from a proprietary format to a portable AR object including one or more native formats for rendering by devices running operating systems in the one or more native formats, storing, by a content management system, the portable AR object in a storage device for delivery to content consumer devices, and delivering the portable AR content in the one or more native formats to the content provider device running the one or more native formats in response to receiving tokenized data from a real-world environment matching the portable AR content.

In accordance with aspects of the present invention, the method further includes receiving, from a content provider device, additional information about the AR source content including at least one of a geolocation of the content provider device and an operating system of the content provider device. The transforming of the AR source content can further include packaging one or more variants for different operating systems for the one or more native formats into an AR package. The method can further include storing the AR package in a structured database. The method can further include storing the additional information about the AR source content in an unstructured database. The method can further include receiving, from a content provider device, requests for AR content from one or more content consumer devices, the request including at least one of a geolocation and a real-world image at the geolocation. The method can further include determining, in response to the received requests, whether to deliver the portable AR content to the one or more content consumer devices based on the additional information. The additional information can include a marker and the determining comprises comparing the marker to the real-world image to identify the marker at the geolocation.

In accordance with example embodiments of the present invention, a computer program product for delivering portable augmented reality (AR) content, the computer program product comprising a computer readable storage medium having program instructions embodied therewith is provided. The program instructions readable/executable by a computing device to cause the computing device to receive, from a content provider device, AR source content and metadata to be associated with the AR content uploaded by an end user, transform and package, by a content management system, the AR source content into from a proprietary format to a portable AR object including one or more native formats for rendering by devices running operating systems in the one or more native formats, store, by a content management system, the portable AR object in a storage device for delivery to content consumer devices, and deliver the portable AR content in the one or more native formats to the content provider device running the one or more native formats in response to receiving tokenized data from a real-world environment matching the portable AR content.

In accordance with aspects of the present invention, receiving additional information about the AR source content including at least one of a geolocation of the content provider device and an operating system of the content provider device and transforming of the AR source content further comprises packaging one or more variants for different operating systems for the one or more native formats into an AR package. The computer program product can further include storing the AR package in a structured database and storing the additional information about the AR source content in an unstructured database. The computer program product can further include storing the AR package in a structured database and storing the additional information about the AR source content in an unstructured database. The computer program product can further include receiving, from a content provider device, requests for AR content from one or more content consumer devices, the request including at least one of a geolocation and a real-world image at the geolocation and determining, in response to the received requests, whether to deliver the portable AR content to the one or more content consumer devices based on the additional information, wherein the additional information comprises a marker and the determining comprises comparing the marker to the real-world image to identify the marker at the geolocation.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to systems and methods suitable for creating and delivering augmented reality (AR) content. In particular, the present invention relates to systems and methods to assist users in the creation of AR content to be displayed to other users in response to a trigger input and/or at specified geolocations. The present invention can provide a platform to enable the creation, storage, and delivery of portable AR content for display in a quick and efficient manner. The AR content provided by the present invention can be configured to be content that is "portable" to allow the content to be viewable on a variety of computing devices (e.g. smart phones, AR headset devices, future device classes, etc.) without requiring significant changes to the respective applications running different platforms. The AR content can be content that is created in open formats that is transformed such that it is available across multiple different platforms without having to modify the underlying application displaying said content. This process is enabled by transforming source AR content into a native content type that can be downloaded and rendered by a receiving application at runtime. By having AR content that can be deliverable on demand, a unique process is created that allows AR content to be managed separately from the application(s) displaying the AR content. Thus, content within an application can be changed over time, enabling applications to be able to dynamically download and render that AR content without having to be recompiled and/or re-deployed the applications themselves. Although the present disclosure discusses embodiments configured to create, save, transform, deliver, etc. AR content, as would be appreciated by one skilled in the art, any combination of content could be utilized without departing from the scope of the present invention. For example, the content can include any combination of visual (e.g., graphical, virtual reality (VR), mixed reality, textual, etc.) haptic, audio media being delivered to users.

FIGS. 1 through 7, wherein like parts are designated by like reference numerals throughout, illustrate an example embodiment or embodiments of improved operation for providing AR content across multiple different platforms in an quick and efficient manner, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

Figure 1:
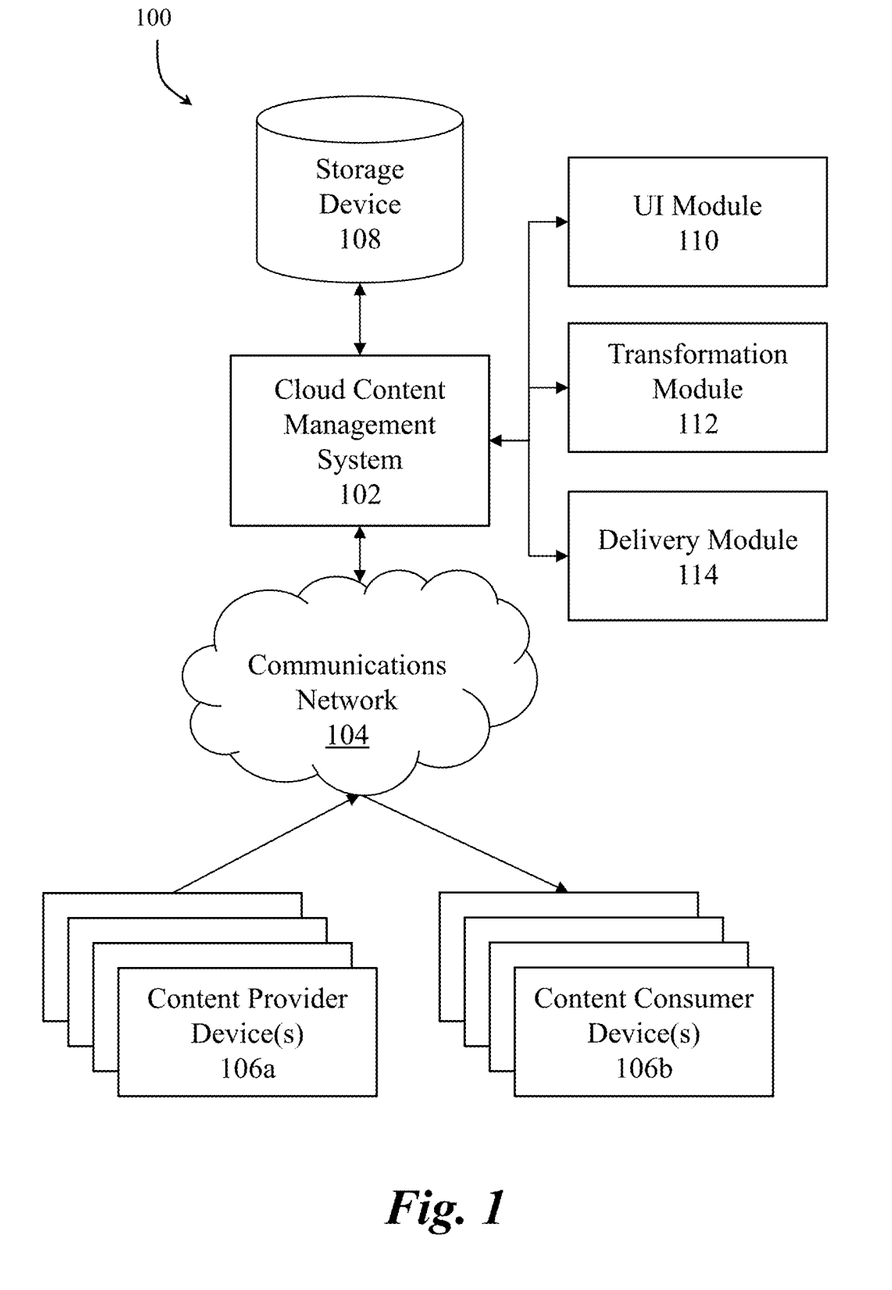
FIG. 1 is an exemplary system for implementing the present invention.

FIG. 1 depicts an illustrative system 100 for implementing the features in accordance with some embodiments of the present invention. In particular, FIG. 1 depicts a system 100 including a cloud content management system 102, a communications network 104, and a plurality of user devices 106a, 106b. The cloud content management system 102 can be a combination of hardware and software configured to carry out aspects of the present invention. In some embodiments, the cloud content management system 102 can include a computing system with specialized software and databases designed for providing a method for creating, transforming, storing, and/or delivering AR content or a combination thereof. For example, the cloud content management system 102 can be software installed on a cloud based computing device including a web based interface which is accessible by computing devices (e.g., the user devices 106a, 106b). As would be appreciated by one skilled in the art, the cloud content management system 102 can include a single computing device, a collection of computing devices in a network computing system, a cloud computing infrastructure, or a combination thereof. The combination of hardware and software that make up the cloud content management system 102 are specifically configured to provide a technical solution to a particular problem utilizing an unconventional combination of steps/operations to carry out aspects of the present invention. In particular, the cloud content management system 102 is designed to execute a unique combination of steps to provide a novel approach to providing portable AR content to users. For purposes of this disclosure, portable AR content can include any AR content that can be delivered to user devices and run by applications thereon without requiring the applications to be recompiled or redeployed.

In some embodiments, the cloud content management system 102 can include a storage device 108. The storage device 108 can include any combination of computing devices configured to store and organize a collection of data. For example, storage device 108 can be a local storage device on the cloud content management system 102, a remote database facility, or a cloud computing storage environment. The storage device 108 can also include a database management system utilizing one or more database models configured to interact with a user for accessing and modifying AR content.

Continuing with FIG. 1, the cloud content management system 102 can include a combination of core components to carry out the various functions of the present invention. In some embodiments, the cloud content management system 102 can include, at least, a user interface (UI) module 110, a transformation module 112, and a delivery module 114 to provide the functionality of the present invention. As would be appreciated by one skilled in the art, the modules 110, 112, 114 can include any combination of hardware and software configured to carry out the various aspects of the present invention. In particular, each of the modules 110, 112, 114 are configured to provide users with a system to create, store, and receive portable AR content.

In some embodiments, the cloud content management system 102 can act as a centralized host, for the user devices 106a, 106b, providing the functionality of the modules 110, 112, 114, sharing a secured network connection. As would be appreciated by one skilled in the art, the plurality of user devices 106a, 106b can include any combination of computing devices, as described with respect to the cloud content management system 102. For example, the plurality of user devices 106a, 106b can include any combination of servers, personal computers, laptops, tablets, smartphones, etc. In accordance with an example embodiment of the present invention, the computing devices 106a, 106b are configured to establish a connection and communicate over communications network 104 to carry out aspects of the present invention. As would be appreciated by one skilled in the art, the communications network 104 can include any combination of known networks. For example, the communications network 104 may be combination of a mobile network, WAN, LAN, or other type of network. The communications network 104 can be used to exchange data between the computing devices 106a, 106b, exchange data with the storage device 108, and/or to collect data from additional sources.

In accordance with an example embodiment of the present invention, the UI module 110 is configured to provide a mechanism for content providers to create and customize AR content to be displayed to content consumers. In some embodiments, the UI module 110 can be configured to provide a web portal interface for content providers (e.g., via content consumer devices 106b) to login to the system 102 (e.g., via web browser) to upload and customize their AR content. The UI module 110 can provide any combination of interfaces to access to the system 102. For example. The UI module 110 can provide a webpage, an application program interface (API), a mobile application interface, or any combination thereof.

In some embodiments, the UI module 110 can be configured to receive and store a combination of content and data from content provider device(s) 106a. For example, the UI module 110 can be configured to receive uploaded AR content source files (e.g., 2D AR content, 3 AR content, or other multimedia) and data to be associated with those files. The AR content source files can be received using any combination of formats known in the art. For example, the AR content can be 3D AR content received in a .fbx, .dae, .3ds, .dxf, .obj, .skp, .usdz, etc. file format. In some embodiments, depending on the AR content source, additional files to be associated with the AR content can be uploaded to the system 102 and stored in association with the AR content. For example, if textures are not embedded within the uploaded AR source content, because the AR files reference external texture files, object textures can be uploaded for use with the AR content. In another example, some file formats can support textures that are embedded within that file, such that the textures are referenced within the file itself. The present invention can be modified to accept all combinations of file formats known in the art.

In some embodiments, data to be associated with the AR content can be received by the UI module 110 through any combination of methods known in the art. For example, data or metadata can be received from user Tillable input controls within a graphical interface provided by the UI module 110, the input controls including but not limited to, checkboxes, radio buttons, dropdown lists, list boxes, buttons, toggles, text fields, date field. Once input data is received, the UI module 110 can associate the data with the uploaded AR source content. The input data can be used by the system 102 to determine how the AR content should be formatted and/or displayed. For example, the input data can specify how the content is to be triggered (e.g., response to a marker, geolocation, etc.) to be displayed, when it can be displayed (e.g., specified time period, geolocation, etc.), where it can be displayed (e.g., geolocation, area size, etc.), what devices can display the content (e.g., smartphone, headsets, etc.) and any other combination of rules that the user can specify (e.g., specific users at predetermined points in time at specific locations). In some embodiments, the data can specify parameters for how the AR content itself is displayed. For example, the data can specify an orientation, position, size, etc. of the AR content. Overall, the UI module 110 can be configured to receive any data receivable from content providers and stored within the database structure of the storage device 108.

In accordance with an example embodiment of the present invention, the transformation module 112 can be configured to transform uploaded AR source content, and associated input data, into a native portable format use in accordance with the present invention. The transformation module 112 can be configured to transform the AR source content, any associated textures, and any associated input data into a portable native format, for on-demand delivery to any combination of devices running any combination of operating systems. For example, the AR files, that have either embedded or referenced textures, can be transformed to a file format that is more easily renderable by the platform(s) it will be displayed on (iOS, Android, HoloLens, etc.). This can be an automated step that includes re-packaging files from their proprietary (or commercial) formats to the native format into a native UI technology object that is smaller and faster to render. As would be appreciated by one skilled in the art, content creators can also create AR content in one or more native formats to be uploaded and stored within the for use within the CDN for use in the other steps of the system 102.

In some embodiments, the transformation can include downloading or obtaining the AR source content, any object textures, and input data from storage, gathering parameters for the AR content, including the data and/or metadata associated with the AR content, identify all the operating variants for the AR content, and modifying the AR source content according to the parameters and the optimizations for operating variants. In some embodiments, the transformation can include creating one or more AR packages including displayable AR content according to the specified parameters and optimizations for all of the operating system variants. For example, for mobile applications, the transformation module 112 can create separate variants for iOS®, Android®, Windows®, Blackberry OS®, operating systems for each collection of AR content and compiled into a one or more AR packages for the original AR source content.

In some embodiments, the AR packages can be binary objects stored in unstructured storage. The AR packages can also be associated with data that further defines how the binary object should be displayed (e.g., visual position, orientation, size, etc.) stored in structure storage format to support the app logic to know what AR package to activate (e.g., when a visual marker has been identified, a location is visited by a consumer, etc.). The app logic can be loaded separately from the AR package and can be used to determine what AR needs to be activated what is loaded from the CDN (the AR package).

As a result, the transformation module 112 can transform AR content that is only viewable by a source application to a format that can be downloaded rendered across any platform running one of the variants at runtime. In other words, the transformed AR content becomes portable content that is formatted in a state that is efficiently renderable by any requesting device because the transformed AR content is provided in a format that is native and optimized for the requesting client rendering technology (e.g., iOS, Android, Windows, etc. Operating Systems). For example, if a device is operating iOS, the device will receive AR content that is formatted for rending and displaying within iOS such that once downloaded, the device merely needs to render and display the AR content without any additional formatting. Such functionality enables the system 102 to provide new AR content to a AR display application without having to update, modify, compile, or redeploy the AR display application.

After transformation, the one or more AR packages can be stored for later retrieval (e.g., by the delivery module 114). For example, the one or more AR packages can be stored in any database known in the art (e.g., SQL, CDN blob storage, etc.). The one or more AR packages and the data related thereto can be stored in multiple databases for fast retrieval and delivery to requesting devices. For example, one or more AR packages can be automatically replicated to multiple data centers over multiple geographic areas for distribution to users in those areas. The CDN technology can dynamically replicate this storage to other locations around the planet as the demand for the content increases. By moving this content to different locations on the planet, the content will be physically closer to the consumers to make it faster to download and more reliable experience. In some embodiments, the AR packages can be stored structured data stores to allow content to be queried for fast access and dynamic delivery while the application on the user device is running to be rendered in real-time. For example, the one or more AR packages can be stored in structured SQL-based storage for configuration (e.g., transformation) and data or metadata associated with the one or more AR packages can be stored in separate unstructured data stores (e.g., NoSQL, blob storage, etc.) for distribution (e.g., delivery), In some embodiments, some of the parameters and other metadata associated with the AR package can be stored together in the database. For example, AR packages can include the transformed AR content in a displayable format for a particular device as well as rules and/or an optional marker associated with the AR content that trigger display of that AR content.

In some embodiments, after AR source content has been uploaded to the system 102, a request to convert the AR source content to a native format (e.g., creating of one or more AR packages) can be added to a transformation queue. The transformation module 112 can monitor the transformation queue and initiate conversion of the requested AR source content when new items have been added to the queue. When the transformation module 112 identifies one or more requests in the queue, the transformation module 112 can pull AR source content for transformation based on a priority of the queue (e.g., FIFO, LIFO, list, priority, etc.). After pulling a request, the transformation module 112 can perform the transformation, store the resulting one or more AR packages, and remove the request from the queue upon completion. Each of the one or more AR packages can be stored, by the transformation module 112, in the storage device 108 for use by the system 102.

In accordance with an example embodiment of the present invention, the delivery module 114 can be configured to deliver the natively formatted AR content (e.g., from the AR package) to requesting devices (e.g., content consumer devices 106b) for rendering and display. In some embodiments, the delivery module 114 can be configured to listen to requests from content consumer devices 106b for delivery of AR content. The requests for AR content can be received in response to receiving a particular, visual, audio, geolocation, or motion based cue from the content consumer devices 106b. For example, a content consumer devices 106b running an application compatible with the system 102 can transmit a picture to the system 102 (e.g., via communication network 104) which triggers a request to the delivery module 114 for a specific AR content package. In some embodiments, the delivery module 114, in combination with the other modules of the system 102, can provide AR content to devices via a content delivery network (CDN).

In some embodiments, the delivery module 114 can analyze requests to determine whether and/or what AR content should be delivered based on information received from the requesting device. AR content can be configured for display at certain locations or in response to capturing a particular, visual, audio, geolocation, or motion based cue and the delivery module 114 can determine whether those criteria have been satisfied prior to delivery. For example, the delivery module 114 can analyze a geolocation of the requesting device or an image received from a content consumer device 106*b* to determine whether there is a marker or recognizable surface present in the image that will trigger any AR content, based on the data or metadata associated with AR content in the storage device 108. In response to a valid request (e.g., criteria for some AR content is met), the delivery module 114 can be configured to identify the operating system of the requesting device (e.g., via metadata transmitted by the requesting device) and transmit the appropriate AR package to the device for display.

Figure 2:
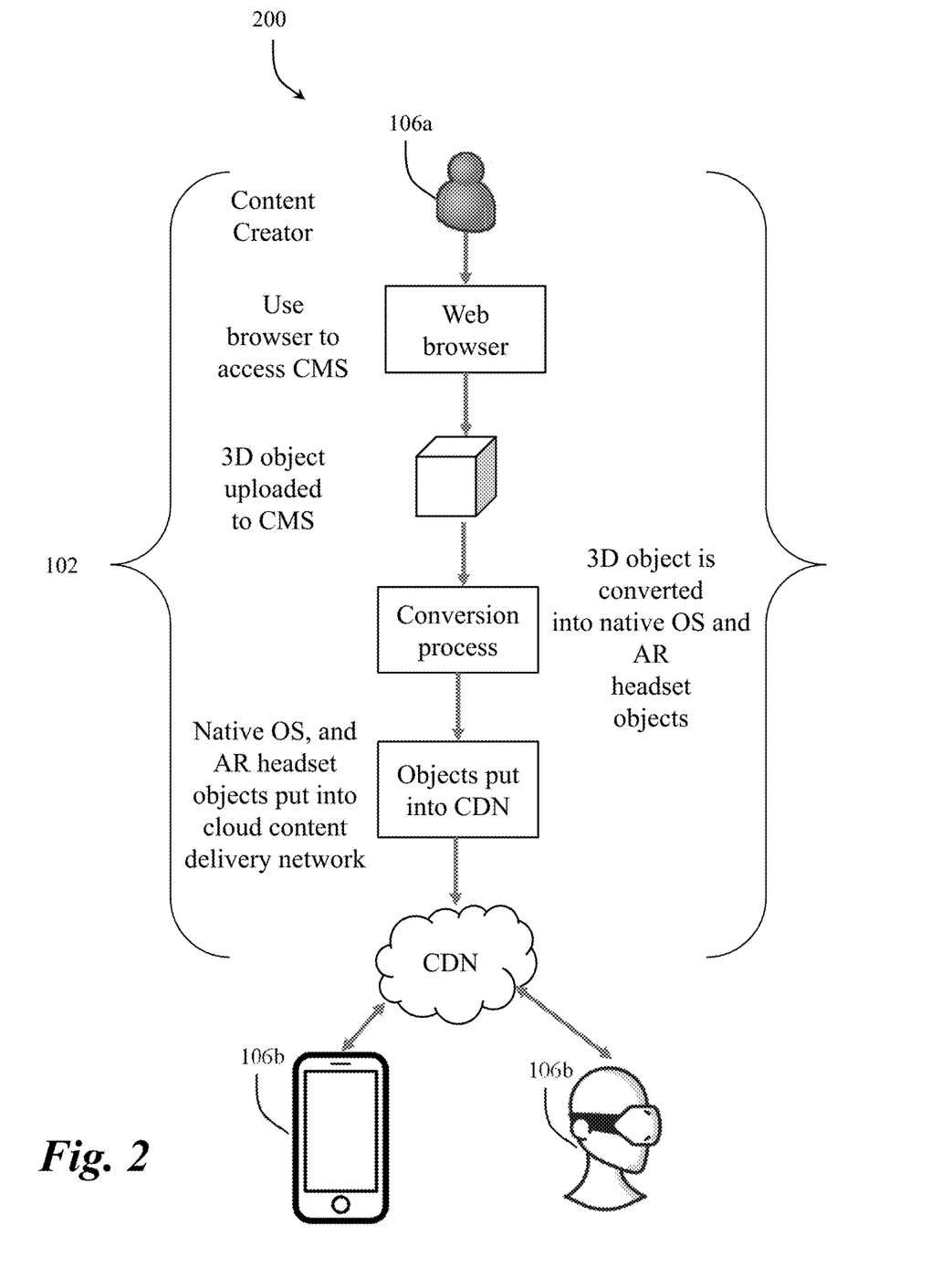
FIG. 2 is an example operation of the present invention.

In operation, the system 100 provides a mechanism in which users can creates and customize self-service AR content. FIG. 2 depicts an example operation 200 of the system 102. In particular, as depicted in FIG. 2, users can login to the cloud content management system 102 or access the system 102 via an application (e.g., via content provider device 106*a*) to upload their AR content and specify how that content is displayed to other users (e.g., via content consumer devices 106*b*). In some embodiments, after uploading the source AR content, using the system 102, the content provider can specify how the content is triggered to be displayed, when it can be displayed, where it can be displayed, and any other combination of rules that the user can specify. Thereafter, the system 102 can transform the AR source content and information provided by the content provider into portable AR content. In some embodiments, the transformation can include tokenizing the portable AR content for comparison against tokenized data received from other devices (e.g., content consumer devices 106*b*). The transformed portable AR content can then be stored in the storage device for delivery via a cloud delivery network to requesting devices 106*b*.

Figure 3:
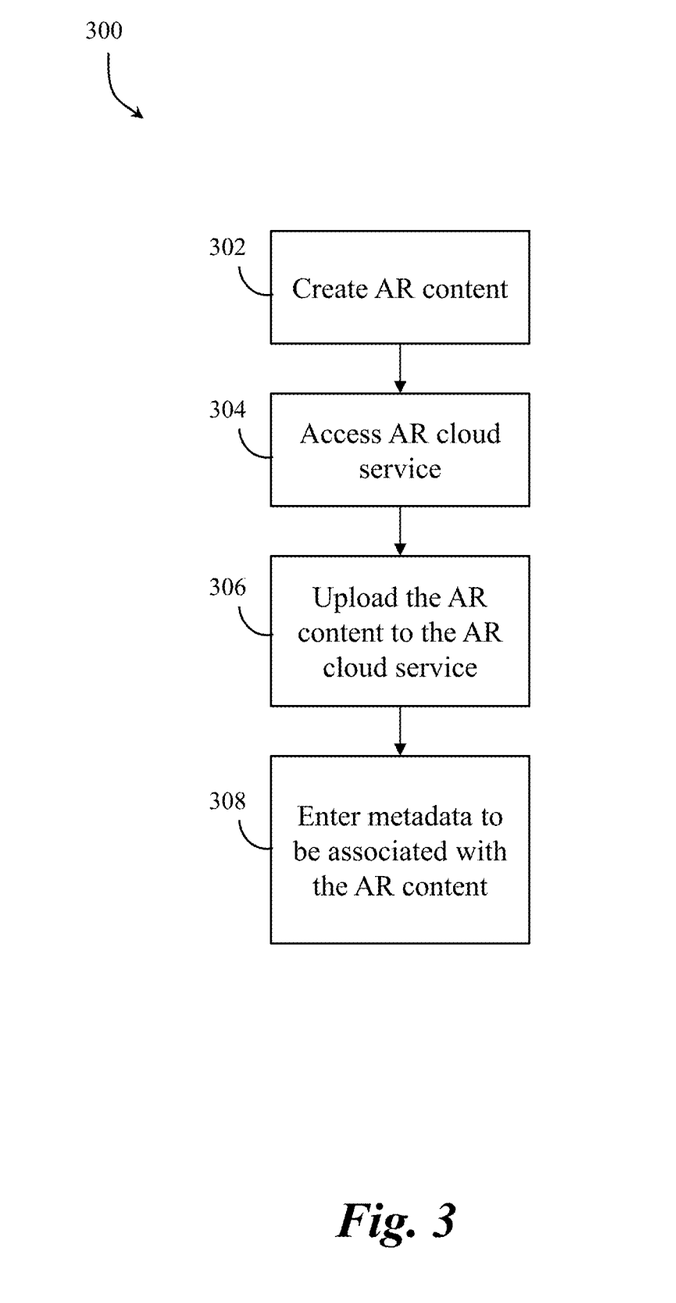
FIG. 3 is an exemplary flowchart for a process for use in accordance with the present invention.

FIGS. 3-6 show exemplary flow charts depicting exemplary processes 300, 400, 500, 600 for implementing the system 100 of the present invention. Referring to FIG. 3, FIG. 3 depicts an exemplary process 300 showing the operation of the present invention from the perspective of a content creator using the system 102, as discussed with respect to FIGS. 1 and 2. At step 302 a content creator can create AR content, on their own device, that is designed to be provided to content consumers. The AR content can include any combination of two-dimensional (2D) or three-dimensional (3D) AR content and can be created using any combination of software known in the art. The AR content can be saved utilizing the proprietary format utilized by the software utilized to create said AR content, the proprietary format being the format that the utilized software saves the created AR content. As would be appreciated by one skilled in the art, the present invention can be utilized with any combination of multimedia and is not limited to use with AR content. For example, the present invention can be used with all types of augmented reality, such as virtual reality, and other audio and visual mediums.

At step 304 the content creator can access the AR cloud service (e.g., system 102) associated with the present invention. The content creator can access the system 102 (e.g., using the content provider device 106*a*) through any combination of methods or systems known in the art. For example, the content creator can access the system 102 by logging into a webpage, through a web portal, through a desktop or mobile application, using an API, or a combination thereof. In an optional embodiment, the application running on the content provider device 106*a* can convert the AR content from a proprietary format to a native format prior to uploading (step 306) the content to the system 102.

At step 306, once accessing the system 102, the content creator can upload the created AR content, in its proprietary format, to the cloud content management system 102 through any means known in the art. When applicable, the content creator can also upload other files to be associated with the AR content. For example, the content creator can upload textures to be applied to the AR content. Previously to or after uploading the AR content, the content creator can add additional information, parameters, etc. to be associated with the uploaded AR content. For example, the content creator can add information related to how, when, where the AR content is to be displayed. Once all information has been entered and all files have been uploaded, the content creator can save the inputs and the AR content will be managed by the system 102.

Figure 4:
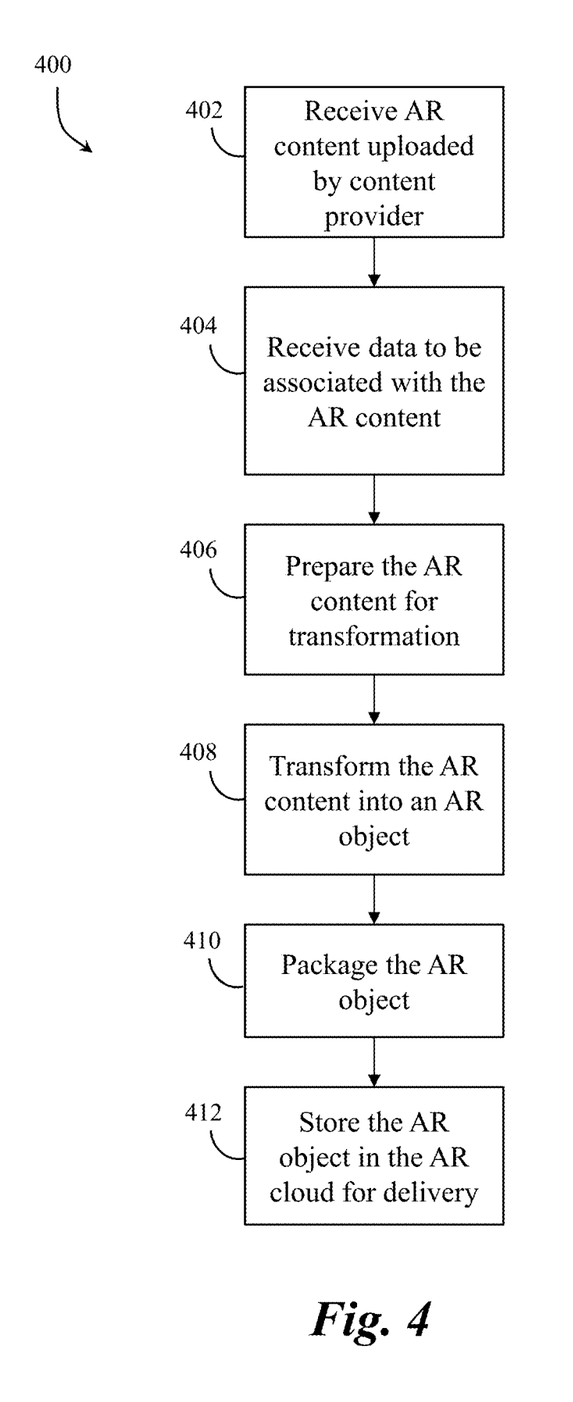
FIG. 4 is an exemplary flowchart for a process for use in accordance with the present invention.

Referring to FIG. 4, FIG. 4 depicts an exemplary process 400 showing an example operation of the present invention from the perspective of the system 102, as discussed with respect to FIGS. 1 and 2. In particular, FIG. 4 shows an example operation for the system 102 receiving and transforming AR content for delivery to content consumer devices 106*b*. Initially, the cloud content management system 102 is made available to content creators and content providers through any combination of methods and systems known in the art. For example, the system 102 can be provided through a webpage, through a web portal, through a desktop or mobile application, using an API, or a combination thereof.

At step 402 the cloud content management system 102 receives AR content uploaded by an end user (e.g., content creator or content provider), as a result of the process 300 in FIG. 3. The received AR content will be saved by the system 102 in a storage device 108. At step 404 the cloud content management system 102 receives input data to be associated with the AR content. The received input data will be saved by the system 102 in a storage device 108. As discussed herein, the AR content and associated data can be saved in the same database structure or in separate and distinct database structures within the storage device 108.

At step 406 the system 102 prepares the AR content for transformation. At step 408 the system 102 transforms the source AR content into a portable AR cloud object. In particular, the system 102 transforms the source AR content saved in a proprietary format into a portable AR cloud object in one or more native formats that can be downloaded and rendered across multiple platforms. The system 102 can transform the source AR content into one or more operating system variants based on the target devices specified by the content creator. For example, for mobile computing devices, the variants can include iOS, Android, Windows, Blackberry OS, etc.

At step 410 the system 102 can package the one or more variants into an AR package for on the fly delivery to requesting devices. The AR package can include one or more of the variants as well as any metadata that may be appropriate for delivering, rendering, and/or displaying the AR content. At step 412 the system 102 stores the transformed AR package in the AR storage device 108 for delivery to requesting devices. Step 412 can also include storing any data and metadata to be associated with the AR package in the storage device 108 to be provided to requesting devices and/or validating requests. Upon completion of process 400, the AR content is ready to be activated as an AR object.

Figure 5:
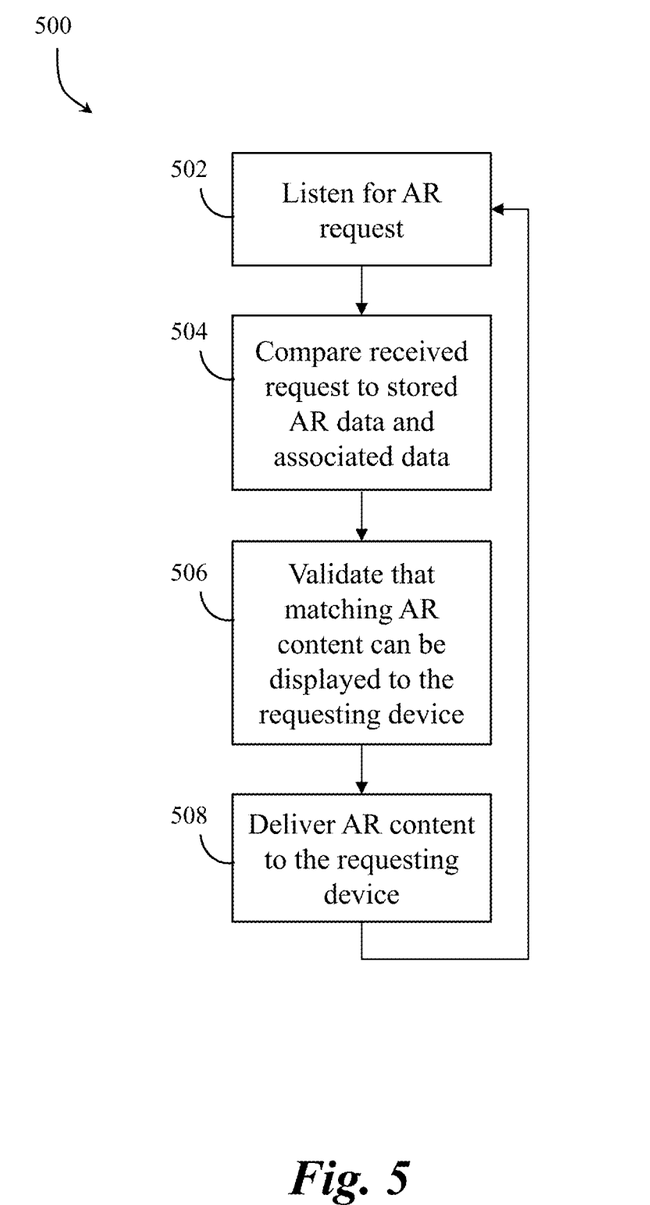
FIG. 5 is an exemplary flowchart for a process for use in accordance with the present invention.

Referring to FIG. 5, FIG. 5 depicts an exemplary process 500 showing an example operation of the present invention from the perspective of the system 102, as discussed with respect to FIGS. 1 and 2. In particular, FIG. 5 shows an example operation for the system 102 delivering AR to requesting content consumer device 106b. At step 502 the system 102 listens for incoming AR delivery requests (e.g., from content consumer devices 106b). Delivery requests can include passive or active requests transmitted by a rendering application on the content consumer devices 106b. As an example of a passive request, the content consumer devices 106b can send requests for AR content based on location and can periodically transmit location information to the system 102 to see if there is any AR content to download. As an example of a active request, the content consumer devices 106b can capture image and/or video of a real world environment and send it to the system 102 requesting any AR content associated with the captured real-world images and/or video. In some embodiments, when transmitting real world images/video, the application on the content consumer devices 106b can tokenize the information prior to including it within the request to reduce the payload of data being transmitted to the system 102. The tokenization simplifies the image structure for reduced size and quick marker recognition, when compared to original images (e.g., AR content uploaded to the system 100).

At step 504 the system 102 can compare the information in the received requests to data stored within the data storage 108. For example, received geolocation data in location based requests can be compared (e.g., in lookup table) to geolocation associated with AR content to see if there is anything nearby that can be rendered. If there is AR content associated with said geolocation, the system 102 can dynamically transmit the AR packages to the requesting device. Similarly, tokenized image/video data received within requests can be compared to the tokenization information for AR content. For example, if the same marker is present in both the real-time image/video and a marker for the AR content, then the AR content will be identified as matching the requested real-world setting. In some embodiments, the application on the content consumer device 106b can be actively conveying tokenized information from a camera feed to the system 102 to determine whether there is recognizable AR content within the system 102 (or storage device 108) that matches the tokenized data received from the content consumer device 106b. When something is recognized, the system 102 determines what AR content should be loaded from what AR package and determine how should it look from the data associated with the AR content (e.g., from the data stored in the structured databases). In some embodiments, the system can store specific parameters (e.g., set by content providers) to enable and disable when/where AR content should be displayed on the content consumer device 106b. The application running on the content consumer device 106b can be configured to honor the specific parameters provided within the system 102, such that it will not display AR content when it is not appropriate, even if the AR content is available on the content consumer device 106b for display.

In some embodiments, a content creator can have the option to pick a piece of AR content from a pre-existing library from the cloud storage of the system 100. When an AR item is selected from that library, it can be downloaded with the same mechanisms described with respect to content creator content. The user then can elect to place that piece of content into the environment (e.g., to be rendered on AR headsets), at a particular location, and/or triggered in response to a particular trigger.

At step 506 the system 102 can validate whether AR content matching the request should be delivered for display. In particular, AR content can include and/or be associated with metadata setting parameters or criteria for when, where, how that AR content should be displayed. For example, AR content associated with a particular location may only be deliverable within a time frame when a particular event is occurring and/or when it is not conflicting with other AR content being displayed. At step 508, if the metadata associated with the AR content permits, the AR content can be delivered to the content consumer devices 106b for rendering and display otherwise AR content will not be delivered.

Figure 6:
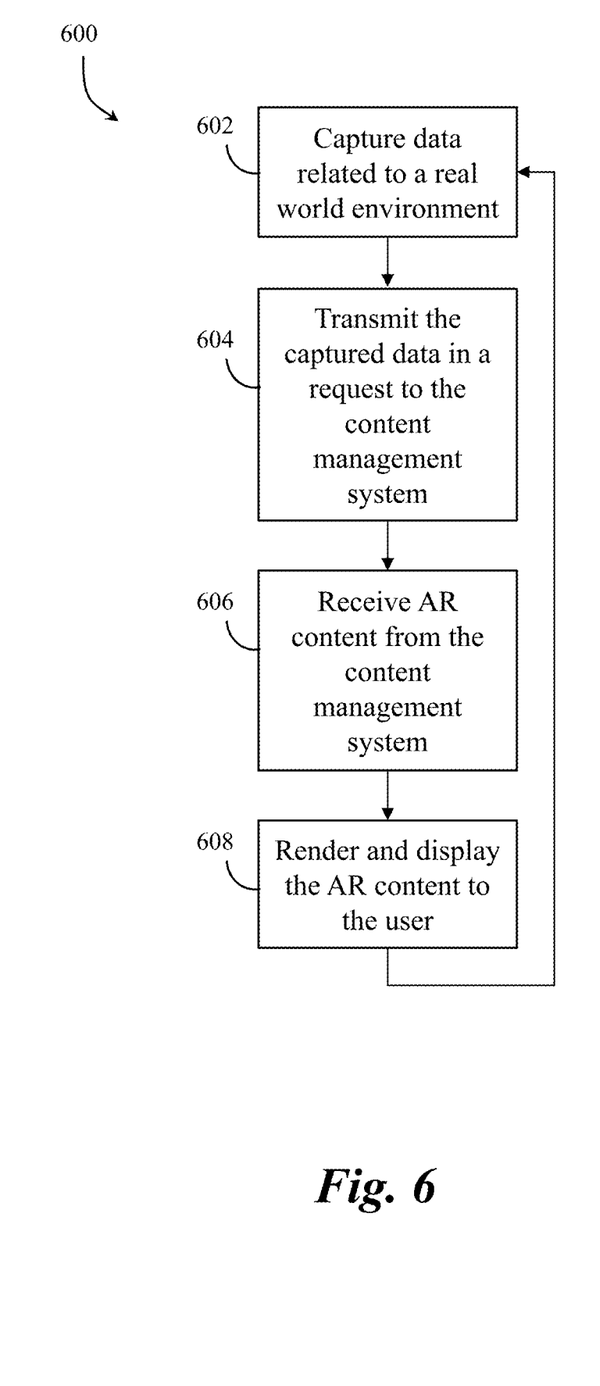
FIG. 6 is an exemplary flowchart for a process for use in accordance with the present invention.

Referring to FIG. 6, FIG. 6 depicts an exemplary process 600 showing an example operation of the present invention from the perspective of a content consumer device 106b, as discussed with respect to FIGS. 1 and 2. In particular, FIG. 6 shows an example operation for the content consumer device 106b requesting and receiving AR content for rendering and display to a user. In some embodiments, the content consumer device 106b can include a rendering application associated with the system 102 of the present invention or a third-party application configured to receive AR content from the system 102. The application on the content consumer device 106b can be configured to handle the operations provided in process 600. In some embodiments, the system 102 can deny the content consumer device 106b permission from displaying AR content, even if the content had already been downloaded. For example, the application can reference the metadata associated with AR content and can determine whether the displaying device is in the right GPS position (as defined in the metadata), whether other content should be activated near other content with other content (e.g., competitors), etc.

At step 602 the content consumer device 106b can capture location data and/or an image or video of a real-world environment. For example, the content consumer device 106b can us a combination of a global positioning system, a camera, and any other combination of data capturing means to capture information about the real-world environment at the user's current location. In some embodiments, the content consumer device 106b can tokenize image or video data and transmit the tokenized data to the system 102 instead of the raw image data.

At step 604 the content consumer device 106b can transmit the captured or tokenized real-world information to the system 102 in a request for AR content that may be associated with said captured real-world information. In addition to the real-world information, the content consumer device 106b can also transmit information about the content consumer device 106b itself, including the operating software that the content consumer device 106b is running. For example, if the device is an iPhone, the content consumer device 106b can identify the iPhone model as well as the version of iOS that the phone is running.

At step 606 the content consumer device 106b can receive a response back from the system 102 including AR content associated with the provided real-world information. The received AR content can already be formatted for rendering and display in a format native to the content consumer device 106b such that it can be displayed on the fly without having to recompile or redeploy the application displaying the AR content on the content consumer device 106b. In instances where the system 102 determines that there is no AR content associated with the received request (e.g., the request failed validation), or that the display of the AR content is not appropriate at that time, the response can include an indication that there is no AR content available for the provided real-world information.

At step 608 the content consumer device 106b can render and display the AR content to the user, based on how the AR package(s) is being activated. For example, for location-based AR, the system can use world mapping capabilities to anchor the AR object to a horizontal surface so a user can move around the object in 3D space and it feels there. In another example, for image-based recognition, the image is actively tracked (once recognized) so that the AR is always shown relative to the tracked image so it feels like it's there.

In some embodiments, the system 102 of the present invention can act as the foundational structure for a plurality of applications and uses. For example, the system 102 can be used, but not limited to, on demand delivery AR content to applications on mobile devices, enable users to create preset AR environments, enable gamification of AR content (e.g., scavenger hunt, AR content collecting, etc.). Similarly, the system 102 can work with combination of different device types, including but not limited to, mobile devices, VR headsets, display devices, etc.

Figure 7:
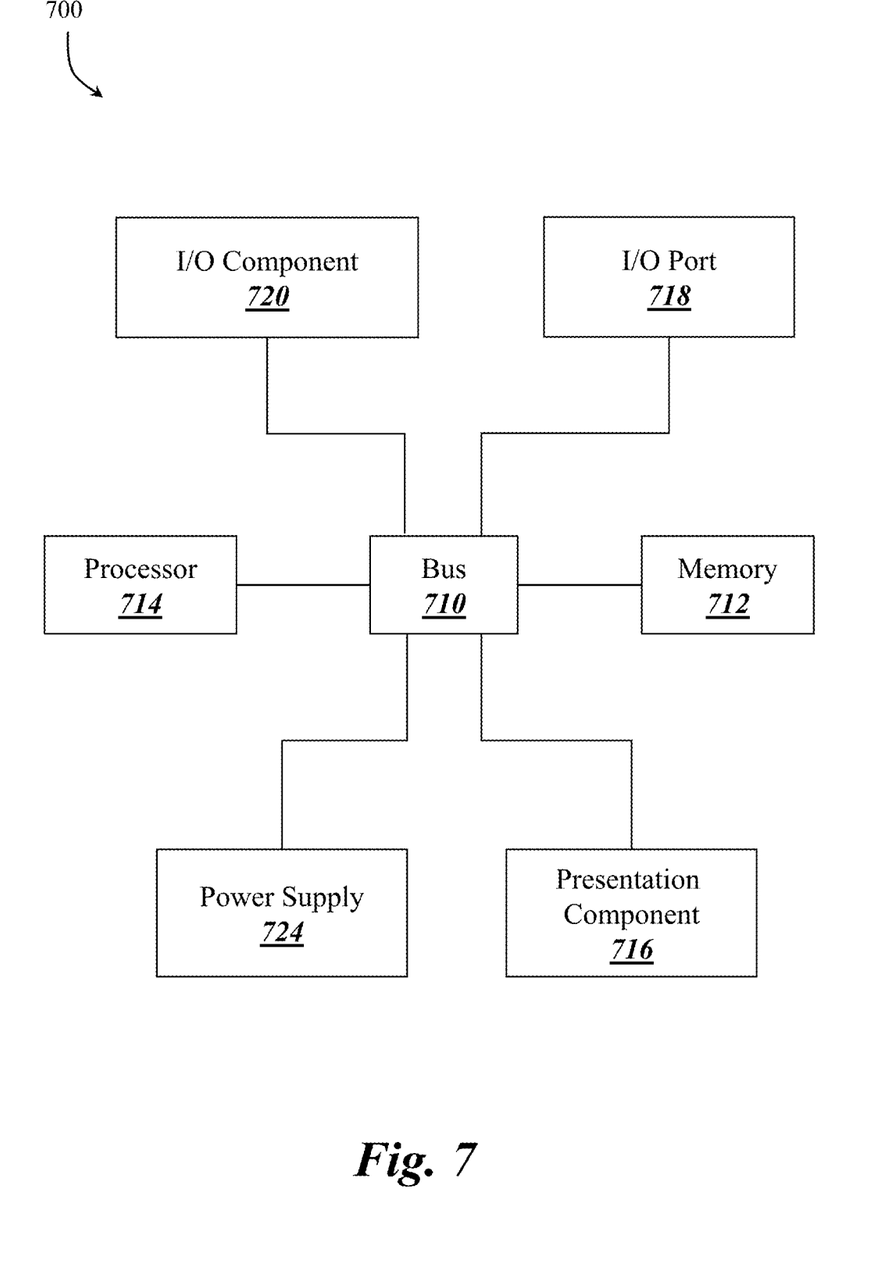
FIG. 7 is an exemplary computer architecture for use in accordance with the present invention.

Any suitable computing device can be used to implement the computing devices 102, 106a, 106b and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 700 is depicted in FIG. 7. The computing device 700 is merely an illustrative example of a suitable computing environment and in no way limits the scope of the present invention. A "computing device," as represented by FIG. 7, can include a "workstation," a "server," a "laptop," a "desktop," a "hand-held device," a "mobile device," a "tablet computer," a "gaming console", a "VR headset", or other computing devices, as would be understood by those of skill in the art. Given that the computing device 700 is depicted for illustrative purposes, embodiments of the present invention may utilize any number of computing devices 700 in any number of different ways to implement a single embodiment of the present invention. Accordingly, embodiments of the present invention are not limited to a single computing device 700, as would be appreciated by one with skill in the art, nor are they limited to a single type of implementation or configuration of the example computing device 700.

The computing device 700 can include a bus 710 that can be coupled to one or more of the following illustrative components, directly or indirectly: a memory 712, one or more processors 714, one or more presentation components 716, input/output ports 718, input/output components 720, and a power supply 724. One of skill in the art will appreciate that the bus 710 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 7 is merely illustrative of an exemplary computing device that can be used to implement one or more embodiments of the present invention, and in no way limits the invention.

The computing device 700 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 700.

The memory 712 can include computer-storage media in the form of volatile and/or nonvolatile memory. The memory 712 may be removable, non-removable, or any combination thereof. Exemplary hardware devices are devices such as hard drives, solid-state memory, optical-disc drives, and the like. The computing device 700 can include one or more processors that read data from components such as the memory 712, the various I/O components 716, etc. Presentation component(s) 716 present data indications to a user or other device. Exemplary presentation components include a display device, speaker, printing component, vibrating component, etc.

The I/O ports 718 can enable the computing device 700 to be logically coupled to other devices, such as I/O components 720. Some of the I/O components 720 can be built into the computing device 700. Examples of such I/O components 720 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A system for delivering portable augmented reality (AR) content, the system comprising:
   a user interface (UI) module being configured to receive AR source content and content display parameters from a content provider device, the content display parameters defining visual formatting;
   a transformation module designed to convert the AR source content and the content display parameters, received from the user interface (UI) module, from a proprietary format to portable AR content having one or more native formats embedded with the content display parameters for device-specific rendering directly by operating systems according to the visual formatting; and
   a delivery module being configured to deliver the portable AR content in the one or more native formats to the content provider device, running the operating systems in the one or more native formats, upon receipt of tokenized data from a real-world environment matching the portable AR content, the portable AR content being embedded with the content display parameters in the one or more native formats causes the content provider device to display the AR source content according to the visual formatting based on the content display parameters.

2. The system of claim 1, wherein the UI module is further configured to receive additional information about the AR source content including at least one of a geolocation of the content provider device and an operating system of the content provider device.

3. The system of claim 2, wherein the transforming of the AR source content further comprises packaging one or more variants for different operating systems for the one or more native formats into an AR package.

4. The system of claim 3, wherein the transforming of the AR source content further comprises storing the AR package in a structured database.

5. The system of claim 4, wherein the additional information about the AR source content is stored in an unstructured database.

6. The system of claim 1, wherein the delivery module is further configured to receive requests for AR content from one or more content consumer devices, the request including at least one of a geolocation and a real-world image at the geolocation.

7. The system of claim 6, wherein, in response to the received requests, the delivery module is further configured to determine whether to deliver the portable AR content to the one or more content consumer devices based on additional information.

8. The system of claim 7, wherein the additional information comprises a marker and the determining comprises comparing tokenization information for the portable AR content to tokenized data of the real-world image to identify the marker at the geolocation.

9. A method for transforming augmented reality (AR) content into portable AR content, the method comprising:
   receiving, from a content provider device, AR source content and content display parameters to be associated with the AR content uploaded by an end user, the content display parameters defining visual formatting;
   transforming and packaging, by a content management system, the AR source content and the content display parameters into from a proprietary format to a portable AR object including one or more native formats embedded with the content display parameters for device-specific rendering directly by operating systems formats according to the visual formatting;
   storing, by a content management system, the portable AR object in a storage device for delivery to content consumer devices; and
   delivering the portable AR content in the one or more native formats to the content provider device running the operating systems in the one or more native formats in response to receiving tokenized data from a real-world environment matching the portable AR content, wherein the portable AR content in the one or more native formats causes the content provider device to display the AR source content according to the visual formatting based on the content display parameters.

10. The method of claim 9, further comprises receiving, from a content provider device, additional information about the AR source content including at least one of a geolocation of the content provider device and an operating system of the content provider device.

11. The method of claim 10, wherein the transforming of the AR source content further comprises packaging one or more variants for different operating systems for the one or more native formats into an AR package.

12. The method of claim 11, further comprises storing the AR package in a structured database.

13. The method of claim 11, further comprises storing the additional information about the AR source content in an unstructured database.

14. The method of claim 9, further comprises receiving, from a content provider device, requests for AR content from one or more content consumer devices, the request including at least one of a geolocation and a real-world image at the geolocation.

15. The method of claim 14, further comprises determining, in response to the received requests, whether to deliver the portable AR content to the one or more content consumer devices based on additional information.

16. The method of claim 15, wherein the additional information comprises a marker and the determining comprises comparing tokenization information for the portable AR content to tokenized data of the real-world image to identify the marker at the geolocation.

17. A computer program product for delivering portable augmented reality (AR) content, the computer program product comprising a computer readable storage medium having program instructions embodied therewith, the program instructions readable/executable by a computing device to cause the computing device to:

receive, from a content provider device, AR source content and content display parameters to be associated with the AR content uploaded by an end user, the content display parameters defining visual formatting;

transform and package, by a content management system, the AR source content and the content display parameters from a proprietary format to a portable AR object including one or more native formats embedded with the content display parameters for device-specific rendering directly by operating systems according to the visual formatting;

store, by a content management system, the portable AR object in a storage device for delivery to content consumer devices; and deliver the portable AR content in the one or more native formats to the content provider device running the operating systems in the one or more native formats in response to receiving tokenized data from a real-world environment matching the portable AR content, wherein the portable AR content in the one or more native formats causes the content provider device to display the AR source content according to the visual formatting based on the content display parameters.

18. The computer program product of claim 17, further comprising:

receiving additional information about the AR source content including at least one of a geolocation of the content provider device and an operating system of the content provider device; and transforming of the AR source content further comprises packaging one or more variants for different operating systems for the one or more native formats into an AR package.

19. The computer program product of claim 18, further comprises storing the AR package in a structured database and storing the additional information about the AR source content in an unstructured database.

20. The computer program product of claim 19, further comprises:

receiving, from a content provider device, requests for AR content from one or more content consumer devices, the request including at least one of a geolocation and a real-world image at the geolocation; and determining, in response to the received requests, whether to deliver the portable AR content to the one or more content consumer devices based on the additional information, wherein the additional information comprises a marker and the determining comprises comparing tokenization information for the portable AR content to tokenized data of the real-world image to identify the marker at the geolocation.

\* \* \* \* \*

UNITED STATES PATENT AND TRADEMARK OFFICE
CERTIFICATE OF CORRECTION

PATENT NO. : 10,997,761 B2
APPLICATION NO. : 16/196557
DATED : May 4, 2021
INVENTOR(S) : Rodney Guzman Page 1 of 1

It is certified that error appears in the above-identified patent and that said Letters Patent is hereby corrected as shown below:

In the Claims

Column 16, Line 21, Claim 9, delete "formats"

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*